Dec. 11, 1951  S. P. ROBINSON  2,578,597
PRODUCTION OF p-TERTIARY-BUTYL PHENOL
Filed Nov. 22, 1948
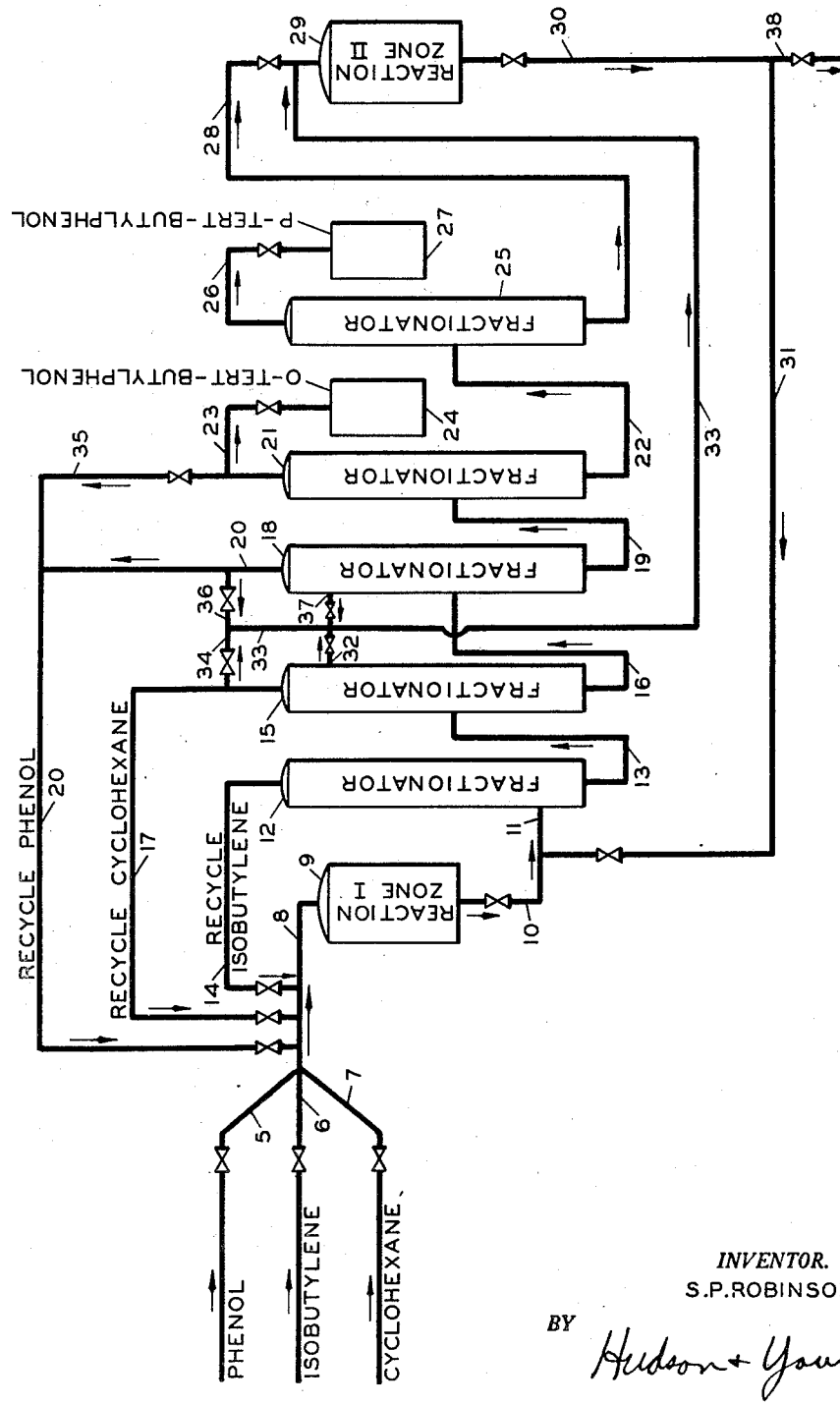
INVENTOR.
S. P. ROBINSON
BY Hudson + Young
ATTORNEYS Patented Dec. 11, 1951

2,578,597

UNITED STATES PATENT OFFICE 2,578,597

PRODUCTION OF p-TERTIARY-BUTYL PHENOL

Sam P. Robinson, Bartlesville, Okla., assignor to Phillips Petroleum Company, a corporation of Delaware Application November 22, 1948, Serial No. 61,327

7 Claims. (Cl. 260—624)

This invention relates to the production of alkyl substituted phenols. In one specific embodiment it relates to a process for improvement of the yield of para-tertiary-butyl phenol obtainable by alkylation of phenol with isobutylene. In another specific embodiment the invention pertains to a process of the nature described in which undesired high-boiling by-products are converted to desired monoalkyl phenols in a particularly advantageous manner.

Heretofore the alkylation of phenols has been accomplished in the presence of catalysts of the Friedel-Crafts type as well as with strong mineral acids and the procedures have included the use of alkyl halides and alcohols as alkylating agents. There are numerous disadvantages inherent in these processes such as the low yields realized, large quantities of condensing agent required, sludge disposal problems, non-selectivity of catalysts and the like. The high operating costs attendant in these conventional phenol alkylation processes render such procedures economically unattractive if, indeed, they are at all feasible for large scale operations.

The alkylation of phenols is particularly complicated on account of the high reactivity of the phenolic group in the presence of catalysts which have been used in such alkylations. For example, undesirable aralkyl ethers are formed in relatively large quantities when attempts are made to introduce alkyl groups into the nucleus of phenols. Other side reactions occur, resulting from the non-selectivity of the catalyst, giving rise to a variety of extraneous products. The formation of relatively large amounts of poly-substituted phenols is frequently noted, thus accounting for greatly decreased yields of the desired monoalkyl derivatives.

Greatly improved phenol alkylation processes have recently been made possible through the use of a specific kind of synthetic catalyst comprising a hydrous silica gel activated with minor proportions of alumina and other metal oxides, preferably in the presence of a hydrocarbon diluent, as disclosed in the co-pending application of Schulze and Mahan, Serial No. 653,590, filed March 11, 1946, now abandoned. The alkylation reaction as thus carried out exhibits much improved selectivity, but even with this high selectivity catalyst the yield of ortho alkyl phenol and para-alkyl phenol is diminished by formation of high-boiling residues, which consist mainly of 2,4-dialkyl phenols, together with minor amounts of isobutylene polymers and other phenols. Formation of the high-boiling residue and other by-products thus adds to the cost of the desired mono-alkyl product, such as p-tertiary-butyl phenol which is currently the product most desired from this reaction.

It is an object of this invention to provide a method for increasing the overall yield of para-tertiary-butyl phenol obtainable by alkylation of phenol with isobutylene. It is a further object of this invention to disclose a process for the reaction of phenol with a 2,4-di-alkyl phenol to yield a mono-alkyl phenol. Still another object of this invention is to provide an integrated process in which para-tertiary-butyl phenol is produced by reaction of isobutylene with phenol in the presence of a hydrocarbon diluent over silica-alumina catalyst at elevated temperatures. Yet another object of this invention is to provide catalysts of increased effectiveness in the partial dealkylation of poly-alkyl-phenols. Another object of this invention is to provide profitable use for spent, or partially spent, silica-alumina catalysts which have been used in the primary alkylation of phenol with an olefin. A still further object is to recover olefin polymers from a phenol alkylation process and convert same to the desired mono-alkyl phenol in which the alkyl group has the same number of carbon atoms as the original olefin reactant. Yet another object is to provide improved catalysts for the reaction of phenols with olefin polymers. Further objects and advantages of this invention will be apparent to one skilled in the art from the accompanying disclosure and discussion.

As indicated hereinabove, when phenol is alkylated with an olefin, particularly a low-boiling olefin such as isobutylene, the principal products are the ortho and the para mono-alkyl phenols in which the alkyl group has the same number of carbon atoms and generally the same chain structure as the olefin reactant. Usually one or the other of the two isomers, i. e. the ortho or the para, will be preferred commercially, and it is usually the para isomer which is the most valuable. Under the preferred conditions of carrying out the present process in which a synthetic silica alumina gel type catalyst is used at elevated temperatures, the para-alkyl phenol predominates over the ortho isomer. In addition to the mono-alkyl phenols, there are also produced, in quantities depending greatly on the catalyst employed and the reaction conditions, minor amounts of dialkyl phenols, such as 2,4-di-tert-butyl phenol, and higher poly alkyl phenols, olefin polymers such as di-butylene and higher poly isobutylenes, mono-alkyl phenols having the same number of carbon atoms in the alkyl group as the olefin polymers just mentioned, such as octyl phenols. I have found that a silica alumina type catalyst as described herein which has been partially spent by use in the alkylation of phenol with a monomeric olefin, is particularly suitable for conversion of the undesired high-boiling products of the nature described to the desired mono-alkyl phenols by reaction of same with added phenol at elevated temperatures.

While one or more of the aforementioned high-boiling by-products have heretofore been reacted with phenol to produce a mono-alkyl phenol, the yields have been extremely low, due to several factors which probably include the high temperatures required for the reactions, which involve dealkylation and depolymerization, and the customarily high activity of catalysts, which are ordinarily of the Friedel-Crafts type such as aluminum chloride.

By the use of spent silica alumina type phenol alkylation catalyst in this connection, I have provided an improved over-all process giving high yields of mono-alkyl phenol product and a minimum of undesired side reactions.

In a preferred embodiment, my invention comprises a unitary overall process in which a phenol and an olefin are the reactants fed to the process and one or more mono-alkyl phenols constitute the ultimate product. The various steps and use of catalysts and various components of the reaction mixtures are combined in a particular manner hereinafter described to give this result. Certain individual steps of the process however in and of themselves constitute features of my invention which can be practiced separately from the other steps when so desired.

A detailed understanding of my invention in a preferred embodiment may be had from a consideration of the accompanying drawing and description thereof. The drawing is a schematic flow diagram showing one preferred arrangement of apparatus elements and flow of materials therethrough suitable for practicing my invention. Numerous conventional items of equipment, such as pumps, valves, heat exchangers, control instruments, as well as details of the elements shown, are not shown on the drawing for the sake of simplicity, since their use will be obvious to one skilled in the art in view of the present disclosure. It will be further understood that the specific arrangement shown, while often preferred, may be varied in one or more particulars without departing from the broad scope of the invention. The process will be illustrated as to its preferred aspects by the alkylation of phenol with isobutylene in the presence of a cyclohexane diluent-solvent, to form ortho-tertiary-butyl phenol and para-tertiary-butyl phenol as products.

In the drawing, phenol, isobutylene and cyclohexane are fed from lines 5, 6 and 7 through line 8 and into alkylation zone 9. Alkylation zone 9 may be a conventional catalyst case, and it is charged with a synthetic silica-alumina catalyst which is herein more fully described. Reaction zone 9 is maintained at an elevated temperature by preheating the feed thereto or by other conventional means, not shown. The total products of reaction leave alkylation zone 9 and pass through lines 10 and 11 into fractionator 12 wherein any unreacted isobutylene is stripped therefrom and is then recycled through lines 14 and 8 to alkylation zone 9. Reaction mixture substantially freed of isobutylene passes through line 13 into fractionator 15, wherein the cyclohexane diluent is removed as overhead product for recycling through lines 17 and 8 to alkylation zone 9. Diisobutylene formed by polymerization in reactor 9 is recovered as a side stream from fractionator 15 via line 32 and is passed through line 33 into a secondary reaction zone 29. Additionally or alternatively, part or all of the diisobutylene may be recovered overhead from fractionator 15 in admixture with the cyclohexane in line 17, and either recycled via lines 17 and 8 to alkylation zone 9 or passed via lines 34 and 33 to secondary reactor 29, or both. Bottoms from fractionator 15 pass through line 16 to fractionator 18, wherein phenol (used in molar excess in the alkylation zone 9) is removed as an overhead fraction and is recycled through lines 20 and 8 to alkylation zone 9. Fractionator 18 is preferably maintained at diminished pressure by means of a suitable vacuum pump or the like (not shown).

Bottoms from fractionator 18 are passed through line 19 into fractionator 21, which is also preferably operated at sub-atmospheric pressures. o-Tertiary-butyl phenol is recovered as overhead fraction through line 23 and is collected in receiver 24 for further use as desired. If the para isomer is the desired product, part or all of the ortho isomer is passed via lines 35, 20 and 8 to alkylation zone 9 wherein formation of the ortho isomer is thereby inhibited. Residue from fractionator 21 passes through line 22 into fractionator 25 wherein p-tertiary-butyl phenol is removed as overhead fraction through line 26 and collected in receiver 27 as a product of the process. It will of course be appreciated that the showing of fractionating and other equipment is diagrammatic and that each unit may be composed of one or more fractional distillation columns of a nature well known to the art.

As heretofore mentioned in addition to diisobutylene there is a limited quantity of triisobutylene formed by polymerization in the alkylation zone 9. This triisobutylene may be separated from the reaction products if desired in fractionator 18, either as a side stream via line 37 or in admixture with the overhead phenol product in line 20. Polymers of isobutylene recovered via line 37 may be passed through line 33 to secondary reactor 29 for ultimate conversion to mono-tertiary-butyl phenol probably by reactions involving both depolymerization to form isobutylene which then alkylates phenol and by direct alkylation of phenol followed by reaction of the resulting heavy alkyl phenol with additional phenol to form mono-tertiary-butyl phenol. Triisobutylene polymers when taken overhead in line 20 together with recycle phenol are partly or completely returned to alkylation zone 9, wherein any isobutylene formed by depolymerization effects direct alkylation of phenol while any higher alkyl phenols formed by alkylation of phenol with such butylene polymers are passed through the separation system and on into secondary reactor 29 for ultimate conversion to mono-alkyl phenol. The action of any diisobutylene returned to reactor 9 as mentioned hereinabove is similar, in that part may form mono-tertiary-butyl phenol, while that part which forms octyl phenol or polymers higher than the dimer will be later recovered for use in reactor 29. When the phenol recovered from fractionator 18 in line 20 is partly passed to reaction zone 29, via lines 36 and 33, the triisobutylene content thereof is at least partially converted to mono-tertiary-butyl phenol as aforesaid. It will be appreciated that in referring to triisobutylene I intend to include all of the various individual $C_{12}$ olefins formed by polymerization of isobutylene and/or its dimer, and in fact the term triisobutylene ordinarily includes a mixture of numerous olefins having more than 8 and less than 16 carbon atoms per molecule.

The heavy residue from fractionator 25 is composed of poly alkyl phenols (largely 2,4-ditertiary-butyl phenol), octyl phenol and the like formed from isobutylene polymers, and heavy olefin polymers. While I may separate one or more components of this mixture for further treatment in reactor 29 in accordance with my invention, the total residue is preferably passed via line 28 into secondary reaction zone 29, which contains partially spent silica alumina catalyst from an alkylation zone 9. Into reactor 29, in addition to the materials previously mentioned, there is introduced phenol, preferably in molar excess of all the other reactants, by way of lines 36 and 33. It is also preferred to employ a saturated hydrocarbon diluent such as cyclohexane, which, with or without diisobutylene, is passed from fractionator 15 via lines 34 and 33 into reactor 29. Reactor 29 is maintained at an elevated temperature preferably considerably higher than that employed in primary reactor 9, and reaction of the various high-boiling byproducts of the primary reaction with phenol to form mono-tertiary butyl phenols is effected with a minimum of undesired cracking, polymerization, and the like, because of the limited and controlled activity of the partially spent catalyst employed in reactor 29.

The total reaction mixture is withdrawn from reactor 29 via line 30 and passed through line 31 into fractionator 12 in admixture with the total effluents from alkylation zone 9 in line 11. Thus the two reactors empty into a common fractionation system, with the advantage that all mono-tertiary-alkyl phenol formed in reactor 29 as well as that formed in the primary reactor 9 is recovered together in receivers 24 and/or 27, while olefin polymers and polyalkyl phenols remaining in the effluent from reactor 29 are recovered at the respective points in the fractionation system for return to reactor 29 for further reaction. A separate fractionation system could be provided for the effluent of reactor 29, from which phenol and diluent and unreacted material would be returned to reactor 29, but this is much less preferred than the process shown in the drawing specified above. A small amount of heavy material, probably comprising poly alkyl phenols, olefin polymers, and various condensation products, formed in both reactors, is incapable of being depolymerized and/or dealkylated to any useful extent into monoalkyl phenols, and to prevent a pyramiding of this material in the system, a portion of the reactor 29 effluent may be bled off from line 30 by way of line 38 and discarded, or if preferred subjected to a separate fractionation (not shown) to separate same from lighter useable materials which are returned to the process.

The fresh silica-alumina catalysts used in alkylation reactor 9 are prepared by forming a hydrous acidic silica gel or jelly (usually from an alkali metal silicate and an acid), washing soluble material from the gel, treating or activating said gel with an aqueous solution of a suitable metal salt, and subsequently washing and drying the activated gel. In this manner a part of the metal, presumably in the form of a hydrous oxide or loose hydroxide compound formed by hydrolysis, is selectively adsorbed by the hydrous silica and is not removed by subsequent washing. The most frequently used catalyst of this type is a silica-alumina catalyst prepared by treating a wet or partially dried hydrous silica gel with an aluminum salt solution, such as a solution of aluminum chloride or sulfate, and finally washing and drying the treated material. Other catalysts of a similar nature may be prepared by using, instead of an aluminum salt, a hydrolyzable salt of a metal selected from group III-B or from group IV-A of the periodic system. More particularly, salts of indium and thallium in addition to aluminum (in group III-B) and salts of titanium, zirconium and thorium (in group IV-A) are employed. Whether prepared by this method or by some modification thereof, the catalyst will contain a major proportion of silica and a minor proportion of metal oxide. This minor proportion of metal oxide, such as alumina, will generally not be in excess of 10 per cent by weight and will often range from about 0.1 to 2.0 per cent by weight. A further detailed description of the preferred silica-alumina gel type catalysts and methods of preparing same is given in U. S. Patent 2,342,196.

For the dealkylation-depolymerization treatment in reactor 29 I employ a silica-alumina gel type catalyst of the type described which has previously been used in the direct alkylation of a phenol with a low-boiling olefin, such as isobutylene. Such catalyst is referred to herein as "spent" catalyst, but this does not necessarily mean that it has lost all its activity for effecting the phenol alkylation with the low-boiling olefin. However, it is preferred that the catalyst first be used for such phenol alkylation at least until its activity therefor has substantially decreased, as shown by a definite drop in conversion at fixed reaction conditions and/or by the necessity of increasing the alkylation temperature to maintain a given conversion level. I may use catalyst in reactor 29 which has been used for alkylation of phenol with low-boiling olefin until the conversion rate of such alkylation reaction at constant temperature decreased to, say, one-half that of the fresh catalyst, or even until the conversion at moderate temperatures has decreased to negligible values, although as a matter of practice it is uneconomic to continue the alkylation to such a point. Catalyst which has been used until the conversion at constant temperature drops by 10 per cent of the original "lined out" conversion level, or catalyst which has been used at a constant conversion by increasing the temperature until such temperature increase amounts to 50–100° F. over the initial "lined-out" operating temperature, is found to have its activity sufficiently modified and tempered to be suitable for employment in secondary reactor 29. While my invention may be carried out by removing catalyst from alkylation zone 9 after it has been used to the desired extent and placing same in reactor 29 while replenishing zone 9 with fresh catalyst, it is often most convenient to provide at least three reactors, and switch the flow of materials from one to the other as desired so that a reactor filled with fresh catalyst is first used as reactor 9 for the alkylation with low-boiling olefin, is then used as reactor 29 for the dealkylation-depolymerization operation, and is then removed from service for replacement of the used catalyst with fresh catalyst. This and various modifications which will attain the same results will be readily understood by one skilled in the art.

My invention in its broadest aspect requires merely that the spent silica-alumina gel type catalyst used for effecting one or more of the reactions described in reactor 29 shall have been previously used in alkylating phenol with a low-boiling olefin. Thus, once such a spent catalyst is available, one could effect the primary alkylation in zone 9 with a different type of catalyst such as a Friedel-Crafts type metal halide, e. g. aluminum chloride, or an activated clay, at suitable conditions known to those skilled in the art. However, such catalysts are ordinarily not as selective as the synthetic silica-alumina catalyst, and have various disadvantages not found in the latter, so that substitution of catalyst in reactor 9 would seldom be desirable.

In carrying out the primary alkylation step in reactor 9, the selected phenol in admixture with the desired molar proportion of olefin and inert diluent is contacted at a pressure such as to maintain liquid or mixed phase operation, generally in the range of about 100 to 1000 pounds per square inch, at a temperature in the catalyst chamber of from about 150° F. to 700° F., with a bed of granular, gel type catalyst comprising silica gel promoted with a minor proportion of a metallic oxide. Temperatures of 200 to 400° F. are preferred. The mol ratio of phenol to olefin may range from slightly more than 1:1 to about 10:1 with a ratio of 2:1 to 3:1 generally preferred. The flow rate, and, therefore, the contact time within the catalyst chamber, is controlled in order to permit extensive reaction of the olefin, say at least 90 per cent, so that the effluent from the reactor comprises largely unconverted phenol, mono-alkylphenol and a small amount of higher boiling material and olefin polymers as described consisting chiefly of dialkyl products. Flow rates of about one to about ten volumes of total feed mixture including diluent per volume of catalyst per hour are satisfactory for efficient operation of the process.

The reactants of the present invention comprise phenols and mono-olefins. Suitable phenolic intermediates include phenol and its alkyl derivatives such as the cresols as well as catechol, hydroquinone and resorcinol. Olefins applicable in the present process are mono-olefins containing at least three carbon atoms and preferably those olefins having branched chains. Straight chain olefins are also included within the scope of the disclosure. Isobutylene is a preferred branched chain olefin. Other olefins which may be used included propylene, butenes-1 and 2, and the pentenes as well as higher olefins though seldom containing more than eight carbon atoms. When an alkyl phenol is employed as starting material to be alkylated with an olefin, it is to be understood that reference herein to monoalkyl phenol products is intended to mean the products obtained by alkylating the said alkyl phenol starting material with the given olefin to add one alkyl group to the nucleus, corresponding in number of carbon atoms and usually in structure to the olefin reactant. For example, a tertiary-butyl cresol is regarded as a mono tertiary butyl phenol or a mono-alkyl phenol within the meaning of present disclosure and claims when prepared by alkylating cresol with isobutylene. Substituents other than hydrocarbon radicals may be contained by either the phenol or the olefin reactants so long as such substituents do not interfere with the reactions involved in this invention.

The inert diluents which may be employed include any materials which exert a solvent action on the reactants and products. Suitable materials include a straight-run naphtha boiling in the range of 200 to 300° F., cyclohexane, and low boiling paraffin hydrocarbons such as butane. These diluents have the desirable effect of aiding in the control of temperature by absorbing heat of reaction, and thus maintaining temperature stability within the system, and side reactions are also minimized by their presence in the reaction mixtures. Liquid phase conditions are ordinarily maintained within the alkylation reactor 9 by imposition of sufficient pressure, except when lowboiling hydrocarbon diluents are employed in which case the operation may be carried out as a mixed phase process.

The dealkylation - depolymerization reactions effected in secondary reactor 29 in the presence of the spent silica-alumina catalyst are preferably carried out at temperatures appreciably higher than those employed in alkylation zone 9, broadly ranging from 300 to 750° F. but preferably from about 300 to 600° F. A molar excess of phenol, of the same order as that employed in the primary alkylation zone 9, is preferably used, and an inert hydrocarbon diluent is also employed for best operation. The proportion of diluent used in this step and also in the primary alkylation step may range from relatively small amounts of say 10 weight per cent of the total reactants up to quantity equal to the weight of total reactants or even more. Flow rates in reactor 29 are correlated with temperature to obtain the desired extent of conversion, higher flow rates being used with higher temperatures; in general the flow rates will range from 1 to 10 liquid volumes of total feed mixture including diluent per volume of catalyst per hour.

While the invention has been described in terms of its preferred embodiments, various modifications thereof will be apparent to those skilled in the art in view of the present disclosure and are therefore within the broad scope of the invention as defined in the accompanying claims.

I claim:

1. A process for the formation of monoalkyl phenols which comprises alkylating a phenol with a low-boiling olefin hydrocarbon in the presence of a synthetic silica-alumina gel type catalyst at elevated temperatures and pressures and in the presence of an inert diluent to form monoalkyl phenol in high yields, recovering said monoalkyl phenol from reaction products, also recovering from said reaction products polyalkyl phenols formed in minor amount in said alkylation reaction, reacting thus-recovered polyalkyl phenols with added phenol at elevated temperatures greater than those employed in the above-mentioned alkylation reaction and in the presence of a synthetic silica-alumina gel type catalyst which has been used in said alkylation reaction until its catalytic activity for said reaction is diminished, and recovering from said reaction of polyalkyl phenol and phenol additional quantities of monoalkyl phenol produced thereby as a product of the process.

2. A process for the formation of mono-tertiary-butyl phenol which comprises alkylating phenol with isobutylene in the presence of a synthetic silica-alumina gel type catalyst at elevated temperatures and pressures and in the presence of an inert diluent to form mono-tertiary-butyl phenol in high yields, recovering said mono-tertiary-butyl phenol from reaction products, also recovering from said reaction products higher-boiling alkyl phenols formed in minor amount in said alkylation reaction, reacting thus recovered higher-boiling phenols with added phenol at elevated temperatures greater than those employed in the above-mentioned alkylation reaction and in the presence of a synthetic silica-alumina gel type catalyst which has been used in said alkylation reaction until its catalytic activity for said reaction is diminished, and recovering from said reaction of higher-boiling alkyl phenols and phenol additional quantities of mono-tertiary-butyl phenol produced thereby as a product of the process.

3. A process which comprises subjecting a reaction mixture composed of isobutylene, phenol in molar excess of said isobutylene, and cyclohexane diluent, to alkylation reaction in the presence of a synthetic silica-alumina gel type catalyst at elevated temperatures in the range of 150 to 700° F. for a time such as to convert at least 90 per cent of said isobutylene to other products comprising a major proportion of mono-tertiary-butyl phenol and minor proportions of isobutylene dimers, isobutylene trimers, and alkyl phenols heavier than mono-tertiary butyl phenol, recovering unreacted isobutylene in a first separation step and recycling same to said reaction, recovering a mixture of cyclohexane and isobutylene dimer in a second separation step and recycling a portion of same to said reaction, recovering a mixture of unreacted phenol and isobutylene trimers in a third separation step and recycling a portion of same to said reaction, recovering mono-tertiary-butyl phenol in a fourth separation step as a product of the process, recovering residue including alkyl phenols higher boiling than said product and passing same into contact with a synthetic silica-alumina gel type catalyst which has previously been used in the aforesaid isobutylene-phenol alkylation reaction, admixing with said residue a portion of the aforesaid recovered cyclohexane containing isobutylene dimers, also admixing with said residue a portion of the aforesaid recovered phenol containing isobutylene trimers, the phenol in the resulting admixture being in molar excess of the other materials excluding cyclohexane, maintaining said admixture in contact with said catalyst at an elevated temperature higher than that employed in the first-named alkylation reaction and in the range of 300 to 750° F. for a time such as to effect formation of additional quantities of mono-tertiary-butyl phenol, passing at least an undivided portion of the total effluents from the last said catalytic treatment into admixture with total effluents from the aforesaid first-named alkylation reaction for separation into components as described hereinabove, and thereby increasing the quantity of mono-tertiary-butyl phenol recovered as a product of the process.

4. In the conversion of polyalkyl phenol to a monoalkyl phenol by reaction of same with a phenol, the improvement which comprises effecting said reaction in the presence of a synthetic silica-alumina gel type catalyst which has previously been employed in the alkylation of a phenol with an olefin.

5. In the conversion of olefin polymer to a mono-alkyl phenol by reaction of same with a phenol, the improvement which comprises effecting said reaction in the presence of a synthetic silica-alumina gel type catalyst which has previously been employed in the alkylation of a phenol with an olefin lower boiling than said polymer.

6. In the conversion of a high-boiling mixture of polyalkyl phenols and olefin polymers to a monoalkyl phenol by reaction of same with a phenol, the improvement which comprises effecting said reaction in the presence of a synthetic silica-alumina gel type catalyst which has previously been employed in the alkylation of said last named phenol with an olefin lower boiling than said polymers at a temperature lower than that at which said first-mentioned reaction is effected.

7. A process for the formation of monoalkyl phenols which comprises alkylating a phenol with a low-boiling olefin hydrocarbon in the presence of a synthetic silica-alumina gel type catalyst at elevated temperatures and pressures and in the presence of an inert diluent to form monoalkyl phenol in high yields, recovering said monoalkyl phenol from reaction products, also recovering from said reaction products higher-boiling alkyl phenols and olefin polymers formed in minor amount in said alkylation reaction, reacting thus-recovered higher-boiling alkyl phenols and olefin polymers with added phenol at elevated temperatures greater than those employed in the above-mentioned alkylation reaction and in the presence of a synthetic silica-alumina gel type catalyst prepared by forming a hydrous acidic silica gel, washing soluble material from the gel, activating said gel with an aqueous solution of a salt of a metal selected from the group consisting of the metals of groups III-B and IV-A of the periodic system, and subsequently washing and drying the activated gel, and which has been used in said alkylation reaction until its catalytic activity for said reaction is diminished to an extent indicated by at least a 10 per cent decrease in conversion at constant temperature, and recovering from said reaction of higher-boiling alkyl phenols and olefin polymers with phenol additional quantities of monoalkyl phenol produced thereby as a product of the process.

SAM P. ROBINSON.

REFERENCES CITED

The following references are of record in the file of this patent:

UNITED STATES PATENTS

| Number | Name | Date |
|---|---|---|
| 2,198,595 | Amos et al. | Apr. 30, 1940 |
| 2,233,408 | Flett | Mar. 4, 1941 |
| 2,295,608 | Ruthruff | Sept. 15, 1942 |
| 2,297,588 | Stevens et al. | Sept. 29, 1942 |
| 2,324,784 | Liber | July 20, 1943 |
| 2,370,810 | Morrell et al. | Mar. 6, 1945 |
| 2,386,969 | Mattox | Oct. 16, 1945 |
| 2,395,199 | Schulze et al. | Feb. 19, 1946 |
| 2,396,682 | Carmody | Mar. 19, 1946 |
| 2,414,764 | Pfennig | Jan. 21, 1947 |
| 2,421,331 | Johnson | May 27, 1947 |
| 2,436,698 | Oblad | Feb. 24, 1948 |